United States Patent
Jákli et al.

(10) Patent No.: US 12,060,513 B2
(45) Date of Patent: Aug. 13, 2024

(54) POLYMER STABILIZED PARABOLOID LIQUID CRYSTAL MICROLENSES ARRAY WITH INTEGRATED PANCHARATNAM-BERRY PHASE

(71) Applicants: Antal Jákli, Kent, OH (US); W. S. Kelum Perera, Kent, OH (US)

(72) Inventors: Antal Jákli, Kent, OH (US); W. S. Kelum Perera, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 18/073,073

(22) Filed: Dec. 1, 2022

(65) Prior Publication Data

US 2023/0174864 A1    Jun. 8, 2023

Related U.S. Application Data (60) Provisional application No. 63/285,216, filed on Dec. 2, 2021.

(51) Int. Cl.
| | |
|---|---|
| *G02F 1/1333* | (2006.01) |
| *C09K 19/02* | (2006.01) |
| *C09K 19/14* | (2006.01) |
| *C09K 19/20* | (2006.01) |
| *C09K 19/58* | (2006.01) |
| *G02B 3/14* | (2006.01) |
| *G02F 1/00* | (2006.01) |
| *G02F 1/141* | (2006.01) |
| *C09K 19/04* | (2006.01) |
| *C09K 19/12* | (2006.01) |

(52) U.S. Cl.
CPC ............ *C09K 19/025* (2013.01); *C09K 19/14* (2013.01); *C09K 19/2021* (2013.01); *C09K 19/586* (2013.01); *G02B 3/14* (2013.01); *G02F 1/0027* (2013.01); *G02F 1/141* (2013.01); *C09K 2019/0407* (2013.01); *C09K 2019/122* (2013.01); *C09K 2019/2035* (2013.01); *C09K 2323/061* (2020.08)

(58) Field of Classification Search
CPC .. C09K 19/025; C09K 19/14; C09K 19/2021; C09K 19/586; C09K 19/0407; C09K 2019/0425; C09K 2019/122; C09K 2019/2035

See application file for complete search history.

(56) References Cited

U.S. PATENT DOCUMENTS

| | | | |
|---|---|---|---|
| 7,238,397 B2 * | 7/2007 | Iftime | G02F 1/13718 349/185 |
| 8,264,639 B2 * | 9/2012 | Chien | C09K 19/544 349/182 |
| 2016/0103351 A1 * | 4/2016 | Lavrentovich | G02F 1/1341 349/33 |
| 2023/0174864 A1 * | 6/2023 | Jákli | C09K 19/586 252/299.01 |

* cited by examiner

*Primary Examiner* — Geraldina Visconti
(74) *Attorney, Agent, or Firm* — RENNER KENNER GREIVE BOBAK TAYLOR & WEBER (57) ABSTRACT

The present invention relates to polymer stabilized nematic liquid crystal microlenses. The microlenses can be made from a nematic liquid crystal, a chiral dopant, a reactive monomer, and a photoinitiator. The microlenses can be prepared by spin coating a liquid crystal mixture onto an array including a nickel transmission electron microscope grid. The focal length of the microlens array can be tuned electrically.

16 Claims, 7 Drawing Sheets
(7 of 7 Drawing Sheet(s) Filed in Color)

POLYMER STABILIZED PARABOLOID LIQUID CRYSTAL MICROLENSES ARRAY WITH INTEGRATED PANCHARATNAM-BERRY PHASE

CROSS-REFERENCE TO RELATED APPLICATIONS

This application claims the benefit of U.S. Provisional Application No. 63/285,216, filed on Dec. 2, 2021, which is incorporated herein by reference.

STATEMENT REGARDING FEDERALLY SPONSORED RESEARCH OR DEVELOPMENT

This invention was made with government support under DMR-1904091 awarded by National Science Foundation. The government has certain rights in the invention.

FIELD OF THE INVENTION

One or more embodiments of the present invention relate to liquid crystal microlenses and corresponding arrays. One or more embodiments of the present invention relate to paraboloid shape plano-concave nematic liquid crystal microlenses made with a chiral dopant, where the microlenses have relatively decreased focal length. One or more embodiments of the present invention relate to liquid crystal microlenses made with a chiral dopant and a reactive monomer.

BACKGROUND OF THE INVENTION

Liquid crystal (LC) molecules are anisotropic, and their average direction ("director") can be influenced by bulk (electric, magnetic, or mechanical) fields and surface interactions. As the refractive index depends on the director orientation, the focal length of LC-based microlens arrays can be tunable without changing the shape of the lens. This makes them attractive in optoelectronics, integrated optics, optical fiber switches, information processing, optical communications, and image processing.

All lenses make use of optical path variations along their radius (r) to focus light. Conventional lenses have a fixed index of refraction, and their optical path, n(r)·d(r), varies due to their thickness (d) variation. Flat lenses with a constant thickness can be either gradient-index (GRIN) lens elements or Pancharatnam-Berry (PB) phase lenses. GRIN lens elements use spatially varying refractive index profiles to vary their effective refractive index n(r) and therefore they also vary their optical path. In PB phase lenses, in the plane of the lens, the azimuthal angle ($\beta$) of the director varies with radius in the plane normal to the light path causing the radial component of the refractive index to vary as well.

Convex or concave lenses, such as eyeglasses, have simple spherical surfaces, while Fresnel lenses have complex shapes that contain portions of a sphere. Even with a perfectly designed and manufactured spherical lens profile, some distortion, called a spherical aberration, is created for light that passes through the lens away from its center. To improve optical properties, aspheric lenses, which gradually change the curvature from the center of the lens out to the edge, can be used. Aspheric lenses may be designed to eliminate the spherical aberration, create a wider field of view, and deliver improved spot size and better peripheral vision with a more compact, lighter design. Although every surface that deviates from spherical symmetry is an aspheric surface, optical designers typically consider aspheric lenses to be non-spherical rotationally symmetric surfaces.

Gray-scale mask lithography, ultra-precision diamond cutting, surface manipulation by an electrostatic field, femtosecond laser-induced two-photon polymerization techniques, and micro-milling are some of the most common fabrication methods for creating aspheric microlens arrays. However, these methods are either complex or high in cost, and therefore undesirable for industrial manufacturing.

Therefore, there is a need in the art for improved microlenses, an improved array, and an improved fabrication method of creating the microlenses and array.

SUMMARY OF THE INVENTION

An embodiment of the present invention provides a composition for making a polymer stabilized nematic liquid crystal microlens, the composition including a nematic liquid crystal, a chiral dopant, a reactive monomer, and a photoinitiator.

An additional embodiment of the present invention provides a method of preparing polymer stabilized nematic liquid crystal microlenses, the method including steps of providing a liquid crystal mixture including a nematic liquid crystal, a chiral dopant, a reactive monomer, and a photoinitiator; applying the liquid crystal mixture to a grid; spin coating the grid having the liquid crystal mixture to thereby form a spin coated assembly; and allowing polymerization of the reactive monomer of the spin coated assembly to thereby prepare the polymer stabilized nematic liquid crystal microlenses.

An additional embodiment of the present invention provides an array including a glass substrate having a top surface; a coating on the top surface of the glass substrate; and a plurality of polymer stabilized nematic liquid crystal microlenses positioned within a grid on the coating, the microlenses including a nematic liquid crystal, a chiral dopant, a polymer made from a reactive monomer, and a photoinitiator or a residue thereof, the polymer including domains which include the nematic liquid crystal and the chiral dopant.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a variety of images, where: item (a) shows a polarized optical microscopy (POM) image of a lens made from achiral 4-cyano-4'-pentylbiphenyl (5CB) 0 minutes after spin coating has completed; item (b) shows a POM image of a lens made from 5CB 5 minutes after spin coating has completed; item (c) shows a POM image of a lens made from 5CB 15 minutes after spin coating has completed; item (d) shows a POM image of a lens made from 5CB 25 minutes after spin coating has completed; item (e) shows a POM image of a lens made from 5CB 1 hour after spin coating has completed; item (f) shows a POM image of a lens made from 5CB 5 hours after spin coating has completed; item (g) shows a POM image of a lens made from 5CB, 2-methyl-1,4-phenylene bis(4-(3-(acryloyloxy)propoxy)benzoate (RM257), and 2,2-Dimethoxy-1,2-diphenylethan-1-one (Irgacure® 651) 25 minutes after photopolymerization has taken place; item (h) shows the same image as in item (g) with the polarizer aligned with the rubbing direction of the image of item (g); item (i) is an illustration of the average director profile of the image shown in item (g);

DETAILED DESCRIPTION OF ILLUSTRATIVE EMBODIMENTS

One or more embodiments of the present invention relate to liquid crystal microlenses. One or more embodiments of the present invention relate to a liquid crystal microlens array. One or more embodiments of the present invention relate to a method of making the array. Each microlens can be a plano-concave lens having a paraboloid profile. The array can be fabricated by spinning. Once fabricated, the lenses can be stabilized, such as by photopolymerizing. The photopolymerization can include polymerizing a reactive monomer mixed into the liquid crystal composition. Advantageously, the microlenses have relatively decreased focal lengths. The decrease of the focal length can be based on utilizing increasing amounts of chiral dopant concentrations. The focal lengths may also depend on the polarization state of the incoming light into the lenses.

The liquid crystal microlenses, which may be referred to as lenses, of one or more embodiments of the present invention are curved liquid crystal lenses. Curved liquid crystal lenses with spatially varying director structure are extremely complicated and are considered to be a mixed lens that is a combination of a curved lens, a gradient-index (GRIN) phase lens, and a Pancharatnam-Berry (PB) phase lens. The curved liquid crystal lenses of one or more embodiments of the present invention remain transparent even after polymer stabilization and still create well-focused images. The lenses of one or more embodiments of the present invention can be produced by utilizing an achiral liquid crystal and can have focal distances that depend on the polarization direction of the incoming light with respect to the rubbing direction. More specifically, the focal length is larger when the light is polarized perpendicular to the rubbing direction. This is understood in terms of the paraboloid shape of the lenses. When the light polarization along the rubbing direction gives an effective refractive index of 1.71, and when the light is polarized in a direction perpendicular to the rubbing direction, the effective refractive index is 1.54. With a chiral cell the helical path is smaller than the film thickness, therefore roughly the same volume of the material has the director parallel and perpendicular to the rubbing direction. This helps to explain why the focal length is independent of the polarization direction of the incoming light.

One or more embodiments of the present invention relate to a liquid crystal mixture, which may also be referred to as a liquid crystal composition. The liquid crystal mixture includes a liquid crystal, which can be an achiral nematic liquid crystal. The liquid crystal mixture can further include one or more of a reactive monomer, a photoinitiator, and a chiral dopant.

The liquid crystal used to create the lenses can be any suitable room temperature nematic liquid crystal with positive dielectric anisotropy. In one or more embodiments of the present invention, the liquid crystal is a cyanobiphenyl. In one or more embodiments of the present invention, 4-cyano-4'-pentylbiphenyl (5CB) is the nematic liquid crystal. Other suitable liquid crystals include those generally known as E7, MLC 2139, and HTG-135200.

In order to better understand suitable liquid crystal compositions, lenses of pure achiral 5CB in its nematic phase were formed. These lenses of pure achiral 5CB, which were specifically formed by spin coating for 50 seconds at 3000 rpm, gradually flattened in the absence of polymer stabilization. This is generally shown in items (a) through (f) of FIG. 1. The flattening is evidenced by the gradual decrease in the number of rings, where after 5 hours all that is left is a flat film showing a uniform color.

Therefore, in order to stabilize the lenses, a reactive monomer can be added to the liquid crystal composition of one or more embodiments of the present invention. The reactive monomer can be any suitable bifunctional mesogenic reactive monomer. In one or more embodiments, the reactive monomer is 2-methyl-1,4-phenylene bis(4-(3-(acryloyloxy)propoxy)benzoate (RM257).

In addition to a reactive monomer, a photoinitiator can be added to the liquid crystal composition of one or more embodiments of the present invention in order to be able to photopolymerize the reactive monomer. In one or more embodiments, the photoinitiator is 2,2-dimethoxy-1,2-diphenylethan-1-one (Irgacure® 651). Other suitable photoinitiators include those generally known as Irgacure 184, Irgacure 784, and Irgacure 369.

In one or more embodiments, the method of photopolymerization is exposure to UV light. Suitable properties of the UV light will be generally known to the skilled person.

Upon polymerization (e.g. photopolymerization) the reactive monomer disclosed above will become a polymer. That is, in one or more embodiments the microlenses include a polymer made from a bifunctional mesogenic reactive monomer. In one or more embodiments the microlenses include poly(2-methyl-1,4-phenylene bis(4-(3-(acryloyloxy)propoxy)benzoate).

It has been discovered that if photopolymerization is initiated relatively quickly after the microlenses are fabricated (e.g. after spin coating is completed), the flattening of the lenses is generally reduced. This may include the flattening coming to a stop within about 15 minutes. In one or more embodiments, the photopolymerization occurs within 30 seconds, in other embodiments, within 1 minute, and in other embodiments, from about 30 seconds to about 1 minute, after the microlenses are fabricated (e.g. after spin coating is completed).

Figure 1:
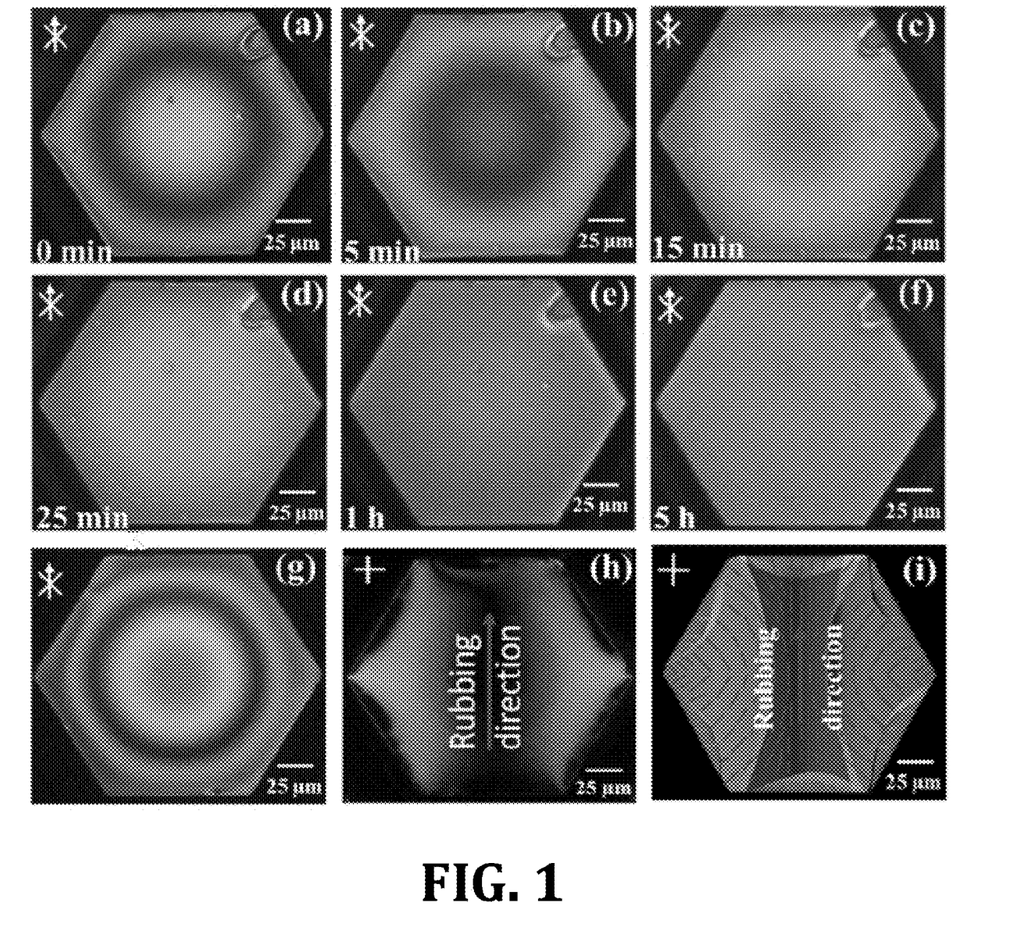

With reference to item (g) of FIG. 1, a POM image of a lens is shown, which lens was made from a composition including an achiral nematic liquid crystal, a reactive monomer, a photoinitiator, and a chiral dopant. Item (g) of FIG. 1 shows the rubbing direction (indicated by the white arrow at the top left) of the bottom glass substrate that the lens was made on making an angle of about 45° with respect to the crossed polarizers. The effect of the reactive monomer and photoinitiator can be seen by a comparison between item (g) and item (a) of FIG. 1.

As the sample in item (g) of FIG. 1 is rotated with respect to the polarizer, the axial symmetry of the birefringence patterns was lost, with the largest asymmetry coming when one polarizer was aligned with the rubbing direction as shown in item (h) of FIG. 1. The pattern of dark areas, where the director is either parallel or perpendicular to the rubbing direction, implies that the liquid crystal director is parallel to the rubbing direction in most of the cell. Based on these observations and knowing the alignment on the liquid crystal near the vicinity of the grids is perpendicular to the grid walls, the approximate corresponding director distribution is shown with item (i) of FIG. 1. This director field also explains why the texture shown in item (g) of FIG. 1, where the polarizer is at nearly 45° to the director over most of the area, appears axially symmetric.

In addition to the use of a reactive monomer and photoinitiator in a liquid crystal mixture, one or more embodiments of the present invention also include a chiral dopant. The chiral dopant can be any suitable chiral dopant. In one or more embodiments, the chiral dopant is S-(+)-2-octyl 4-(4-hexyloxybenzoyloxy)benzoate (S811). Other suitable chiral dopants include those generally known as BDH 1281, R5011, and R811.

A liquid crystal mixture can utilize differing amounts of a chiral dopant depending on desired properties. In one or more embodiments, a liquid crystal mixture includes from about 0 wt. % to about 8 wt. %, in other embodiments, from about 2 wt. % to about 6 wt. %, in other embodiments, from about 4 wt. % to about 6 wt. %, of a chiral dopant, relative to the amount of overall liquid crystal mixture.

Figure 2:
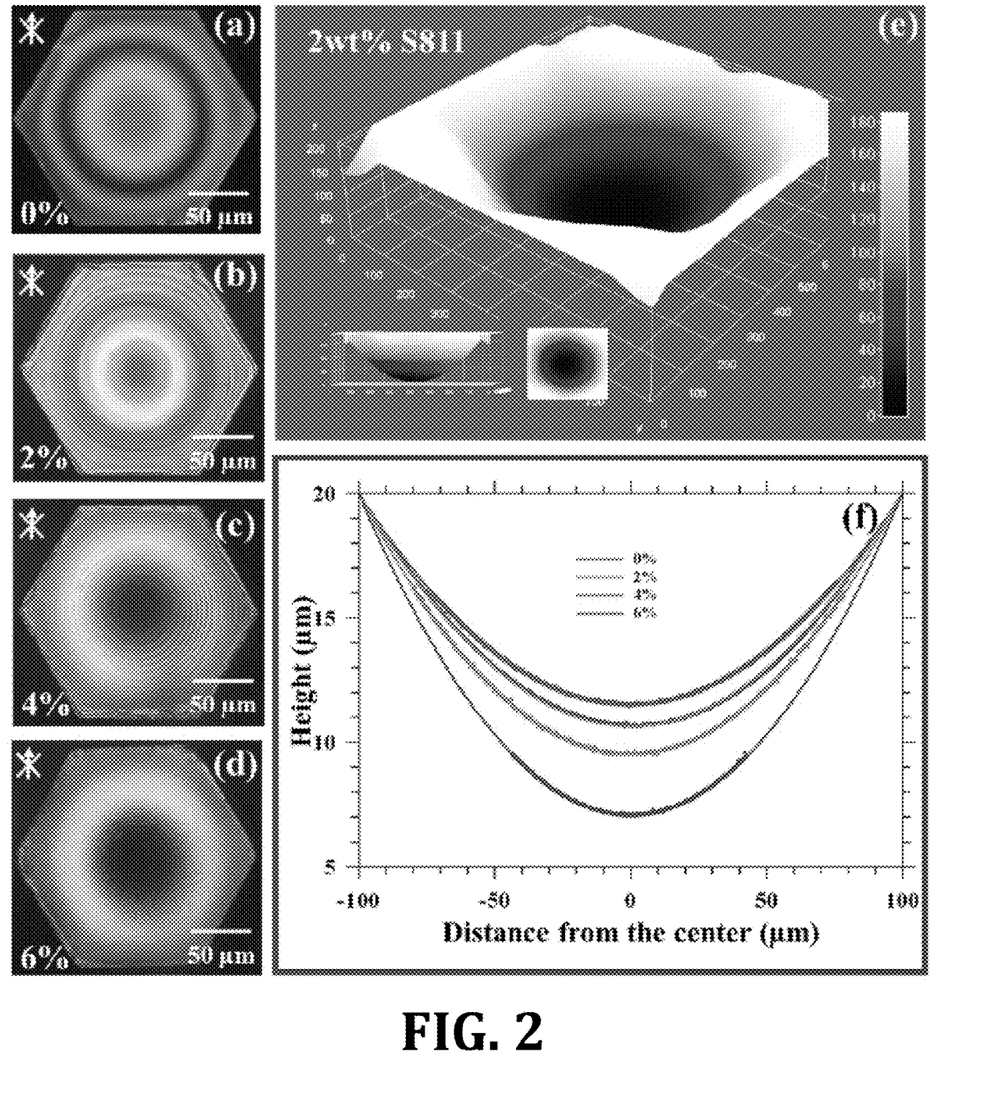
FIG. 2 is a variety of images and graphs, where: item (a) is a POM image of a lens made from 5CB, RM257, and Irgacure 651, without any S-(+)-2-octyl 4-(4-hexyloxybenzoyloxy)benzoate (S811); item (b) is a POM image of a lens made from 5CB, Rm257, and Irgacure 651, and with 2 wt. % S811; item (c) is a POM image of a lens made from 5CB, RM257, and Irgacure 651, and with 4 wt. % S811; item (d) is a POM image of a lens made from 5CB, RM257, and Irgacure 651, with 6 wt. % S811; item (e) is a three-dimensional recreation of the lens of item (b); item (f) is a height profile of the lenses of items (a) to (d)

In order to better understand suitable liquid crystal compositions and lenses, lenses having different specific amounts of the chiral dopant (i.e., S811) were created. The different wt. % utilized were 2 wt. %, 4 wt. %, and 6 wt. %. If the liquid crystal lenses were not mechanically disturbed, they remained stable for at least 3 days, even if photopolymerization had not yet taken place. Once photopolymerized, the lenses were even protected against mechanical shaking. Items (a) through (d) of FIG. 2 show POM images of the photopolymerized microlenses with 0, 2, 4, and 6 wt. %, respectively, of S811. With these microlenses, the rubbing direction of the bottom glass substrate they were prepared on is about 45° with respect to cross polarizers. An increasing number of interference fringes is seen for samples with a higher chiral dopant concentration, indicating decreasing curvature radii.

In embodiments where polymerization (e.g. photopolymerization) is utilized, it is generally understood that after polymerization the chiral dopant, where utilized, and the liquid crystal will be trapped in the domains created by the polymer network. The photoinitiator, where utilized, breaks into free radicals to initiate the photopolymerizing process and most will be used up as terminators of the chains. Reference may therefore be made to the microlenses including a residue of the photoinitiator.

As suggested above, the lenses and array of one or more embodiments the present invention can be fabricated using spin coating, which may be referred to as spinning. As generally known to the skilled person, a small amount (e.g. about 1 µL) of a liquid crystal mixture is put on top of a grid, such as by using a micropipette. The grid can be on a glass substrate, which can include a coating thereon. The coating can be a polyimide, which can be PI-2555 (HD MicroSystems).

Application of the liquid crystal mixture can be followed by spin coating, which speed thereof may be based on any particular liquid crystal mixture. The spin coated mixture on the grid may be referred to as a spin coated assembly. The spin coating forms the lenses, which may include following with a polymerization step (e.g., photopolymerization) to provide a final form of the lenses.

Spin coating forms the lenses and removes material from the individual cells of a grid (e.g., grid of the nickel Transmission Electron Microscope) that the lenses can be prepared in. Moreover, wetting of the grid material (e.g., nickel) by the liquid crystal produces the curved surfaces of the lenses. The curved surfaces of the lenses are indicated by the birefringence colors as shown in items (a) through (f) of FIG. 1. The variation of the color of the concentric rings seen under polarized optical microscopy (POM) shows that the order of the birefringence color increases radially toward the edge, which indicates that the thickness of the LC film increases radially toward the edge of the grid.

As further description of the spinning, the flow due to spinning leads to an escape of some of the liquid crystal mixture within grids to the grid rim or away from the grid entirely. As the flow is opposed by surface tension, it is likely that the level of underfilling at a given speed is larger for a material with a smaller surface tension. The surface tension of the liquid crystal mixture of one or more embodiments of the present invention can be decreased by the addition of the chiral dopant. In this way, more of the samples with higher chiral dopant concentrations may escape from the grid cells during spinning, resulting in a decreased height in the center (i.e., increased depth) and smaller curvature radius at the vertex of the paraboloid-shaped lens.

The observation that the lens shape of the pure liquid crystal before polymerization flattens in a few hours, while the chiral lens shapes remained stable on much longer time scales, can be attributed to the higher effective viscosity of the chiral nematic materials, due to their pseudo layer structure. Whereas pure liquid crystal pushed onto the rim flows back due to its relatively low viscosity, the chiral doped liquid crystal material cannot flow back and therefore cannot refill the grids after the spinning is done.

The spin coating will occur for a suitable time, which can be at least or about 50 seconds, or in other embodiments, at least or about 1 minute. Other suitable times can be utilized, and may be dependent on the speed rate of the spin coating.

In one or more embodiments, the spin coating occurs at a rate of about 2,500 rpm to about 4,000 rpm, in other embodiments, 2,800 rpm to about 3,700 rpm, and in other embodiments, about 3,000 rpm to about 3,500 rpm. Other suitable spin coating rates include about 3000 rpm, about 3300 rpm, about 3400 rpm, and about 3500 rpm. Relatively higher spinning rates may be required at higher doping of the chiral dopant because of increased viscosity.

In one or more embodiments, the grid has a diameter from about 100 μm to about 400 μm. Suitable dimensions of the cells of the grid will be generally known to the skilled person.

In one or more embodiments, a hexagonal grid may be utilized for application of a liquid crystal mixture. Hexagonal grids tend to lead to a circularly symmetric birefringence pattern. In other embodiments, a square grid may be utilized for application of a liquid crystal mixture.

Other details relative to one or more embodiments of the present invention are now disclosed. The absence of a fingerprint texture is expected in hybrid chiral nematic cells with homeotropic alignment (director perpendicular to the surface) at the air interface. This shows that in the lenses that formed after spinning, the flow aligns the director parallel to the air interface. Such a planar alignment sometimes contains a few dislocations, such as seen in item (c) of FIG. 2. Before photopolymerization, most of these dislocations eventually move to the edges without causing any change of the fringe pattern, indicating no effect on the shape of the lens. Also, unlike in the pure 5CB lenses, the fringe patterns are independent of the orientation of the crossed polarizers. This is consistent with a twist of the liquid crystal director through the depth of the cell.

3D surface profiles of the lens of one or more embodiments of the present invention were quantitatively measured with a Digital Holographic Microscope. For example, the 3D surface profile of a lens with 2 wt. % chiral dopant is shown in item (e) of FIG. 2. The inserts in item (e) of FIG. 2 show the top and side views, which indicate an axially symmetric shape over nearly the entire lens. Height profiles, as a function of radial distance from the vertex of the lenses with various concentrations of the chiral dopant, are shown in item (f) of FIG. 2. These POM images show increasing curvatures with an increase in chiral dopant concentration. From these images, it can be understood that the lenses of one or more embodiments of the present invention have a paraboloid shape, instead of a concave spherical profile.

Utilizing a fitting function, the calculated radius of curvature at the vertex and the contact angle at the grid edges were tabulated and are shown in Table 1. These angles are consistent with those obtained, with less precision, from the side view of the shape shown in the inset of item (e) of FIG. 2. From this data, it can be understood that with the lenses of one or more embodiments of the present invention, the radius of curvature decreases, and the contact angle increases, with increasing chiral dopant concentration.

TABLE 1

| Chiral Dopant Concentration (wt. %) | Radius of Curvature (mm) | Contact Angle (°) |
|---|---|---|
| 0 | 0.59 ± 0.02 | 9.6 ± 0.3 |
| 2 | 0.53 ± 0.01 | 10.6 ± 0.2 |
| 4 | 0.48 ± 0.01 | 11.8 ± 0.3 |
| 6 | 0.39 ± 0.01 | 14.5 ± 0.4 |

Figure 3:
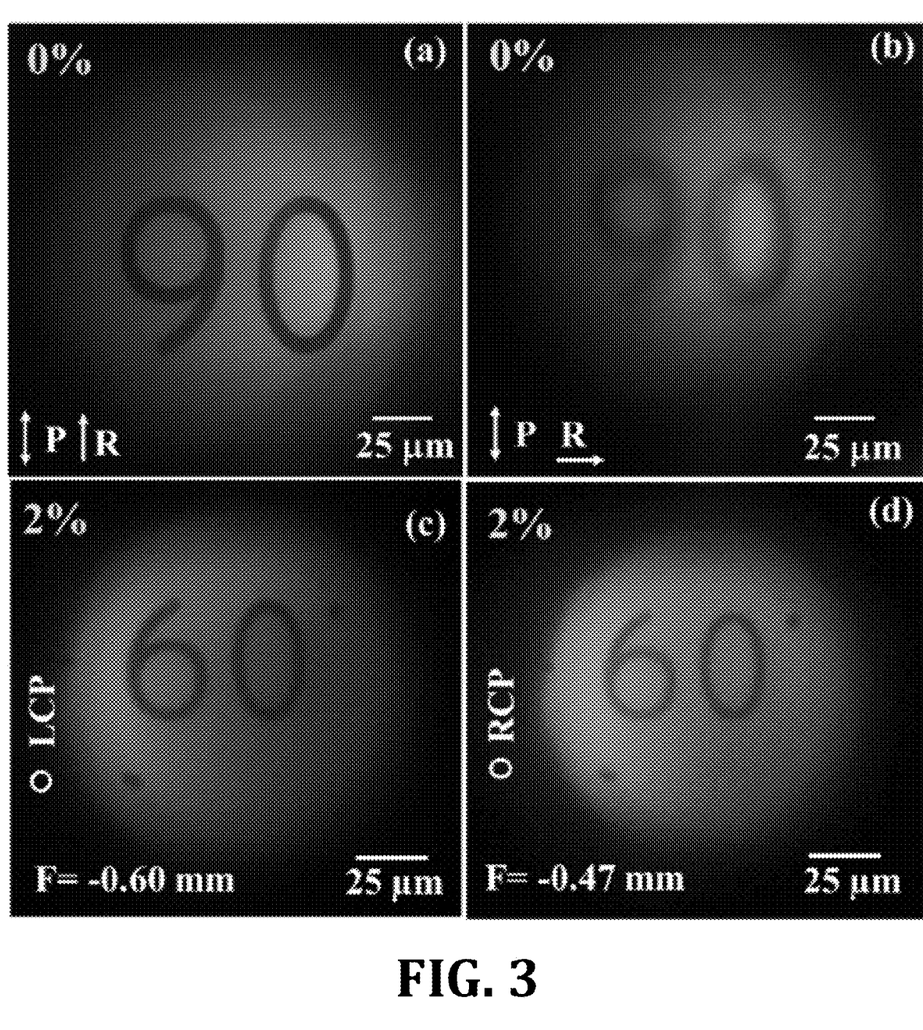
FIG. 3 is a variety of images, where: item (a) is an image of the number 90 seen through a linear polarizer and a lens made from 5CB, RM257, and Irgacure 651; item (b) is the same image as in item (a) except for the polarizer is rotated perpendicular to the rubbing direction of the lens; item (c) is an image of the number 60 seen through a left circular polarizer and a lens made from 5CB, Rm257, and Irgacure 651, and with 2 wt. % S811; item (d) is an image of the number 60 seen through a right circular polarizer and a lens made from 5CB, RM257, and Irgacure 651, and with 2 wt. % S811.

The optical imaging properties of the lenses at different chiral dopant concentration and with different polarization of the incoming light was studied. This is shown in items (a) through (d) of FIG. 3. Item (a) of FIG. 3 shows the image of an achiral sample with one linear polarizer in front of the object "90". The objective of the inverted microscope focuses on the image "90" when the polarizer is parallel to the rubbing direction but becomes defocused when the polarizer is rotated perpendicular to the rubbing direction (see item (b) of FIG. 3), indicating the dependence of the focal length on the polarization direction. The focal length for lenses with chiral dopants did not depend on the linear polarization direction but did depend on the circular polarization of the incoming light. Items (c) and (d) of FIG. 3 show two focused images of an object "60" made with a 2 wt. % chiral dopant concentration between left and right circular polarizers. In both pictures, the objective of the inverted microscope focuses on the image "60", but the focal distances are different; −0.60 mm and −0.47 mm, respectively. A 550 nm green filter was used because the circular polarizers have optimum performance at this wavelength.

Object distance and the image distance were measured for each sample, and their values were then utilized to calculate the focal length of the system. For examples, lenses made with a 2 wt. % chiral dopant concentration had a measured object distance of 3.78 mm and an image distance of 0.49 mm, which provided a focal length of −0.57 mm. Based off of these values, the magnification can be calculated by directly comparing the sizes of the image and the object, with the value coming out to be 0.13. The focal distances of all photopolymerized liquid crystal microlenses of one or more embodiments of the present invention prepared with different chiral dopant concentrations were tabulated for all polarization configurations and are shown in Table 2 below.

TABLE 2

| Chiral dopant concentration (wt. %) | No Polarizer | Linear Polarizer in front on object* | Crossed linear polarizers | Left Circular Polarizer in front of object | Right Circular Polarizer in front of object |
|---|---|---|---|---|---|
| 0 | −0.67 mm | P/R: −0.65 mm; P⊥R: −0.82 mm | −0.67 mm | −0.75 mm | −0.66 mm |

TABLE 2-continued

| Chiral dopant concentration (wt. %) | No Polarizer | Linear Polarizer in front on object* | Crossed linear polarizers | Left Circular Polarizer in front of object | Right Circular Polarizer in front of object |
|---|---|---|---|---|---|
| 2 | −0.56 mm | −0.56 mm | −0.56 mm | −0.60 mm | −0.47 mm |
| 4 | −0.53 mm | −0.53 mm | −0.53 mm | −0.57 mm | −0.49 mm |
| 6 | −0.45 mm | −0.45 mm | −0.45 mm | −0.48 mm | −0.43 mm |

*The focal distances were independent of the orientation of the linear polarizer in front of the object for all except the 0% sample.

The data in Table 2 shows the focal lengths decrease with increasing chiral dopant concentration. This is in accordance with DHM and POM observations showing that increasing chiral dopant concentration leads to decreasing radius of curvature, which is proportional to the focal length. In addition, it is notable that the focal length of the achiral sample depends on the orientation of the linear polarizer in front of the sample. Such a variation was not observed for any of the chiral samples. Another noteworthy observation is that the focal lengths depend on the handedness of the circular polarizers placed in front of the object. For all samples, the absolute value of the focal length is larger for the left circularly polarized light than for the right one. Using no polarizer or crossed linear polarizers (instead of circular polarizers) did not influence the focal length in any of the samples.

One or more embodiments of the present invention also include providing tunable properties. For example, the focal length of the microlens array can be tuned electrically in one or more embodiments. Lenses with tunable focal length play important roles in nature, such as by helping species avoid predators and capture prey. Many practical devices mimic the lens concept for imaging, sensing, and detection. The interest toward electrically tunable lenses and lens arrays has amplified recently, such as for augmented and virtual reality.

One or more embodiments of the present invention include depositing a thin metal layer on the lens array, thereby providing a tunable paraboloid reflector that could be used as a micro-antenna or a light collector for novel photovoltaic devices.

The lenses of one or more embodiments of the present invention can also be made tunable for various external fields such as electric and magnetic fields, heat, and light.

One or more embodiments of the present invention include liquid crystal mixtures including a chiral ferroelectric nematic material (e.g., FNLC-1571 from Merck). The large polarization of the chiral ferroelectric nematic material generally reduces the tuning field by over an order of magnitude compared to dielectric nematic liquid crystals. Where the variation of the refractive index (and therefore the optical path) is written as $$\delta n = c \cdot \frac{\Delta n}{3},$$

one or more embodiments of the present invention include increasing c up to 0.9 by using polymer stabilized isotropic liquid crystal where the polymer network typically has about 10 wt % concentration. One or more embodiments of the present invention also include increasing on up to 0.3 by relying on the electric field induced shape change of the microlens. These effects are achieved based on the large polarization of the chiral ferroelectric nematic material, and as a result of the chirality that leads to the curvature of the lens shape determined by the helical pitch of the chiral nematic material.

An example of a liquid crystal mixture including a chiral ferroelectric nematic material is provided in Table 3 below.

TABLE 3

| Component/Code | Percentage |
|---|---|
| 5CB | 20 wt. % |
| FNLC-1571 (Ferroelectric nematic mixture from Merck) | 57 wt. % |
| BDH 1218 (Chiral dopant) | 7 wt. % |
| RM 257 | 5 wt. % |
| TMPTA (Trimethylolpropane triacrylate) | 5 wt. % |
| EHA (2-Ethylhexyl acrylate) | 5 wt. % |
| Irgacure 651 (Photo initiator) | 1 wt. % |

Relative to the ferroelectric nematic mixture, the polar ordering makes Ferroelectric Nematic ($N_F$) liquid crystals more sensitive to the electric field than regular nematic. Fields as low as $10^3$ V/m can be sufficient to switch the director, thus the ferroelectric nematic liquid crystal will reduce the operating voltage and respond faster to electric fields.

As suggested in Table 3, one or more embodiments of the present invention provide a liquid crystal mixture having one or more of a mono-functional monomer, a bi-functional monomer, and a tri-functional monomer. With specific reference to Table 3, the RM 257, TMPTA, and EHA are bi-functional, tri-functional, and mono-functional monomers, respectively. These form the polymer network via photopolymerization. The use of different monomers is believed to introduce flexibility to the polymer network.

Reference is made to the weight percentages disclosed in Table 3. In one or more embodiments, one or more of these weight percentages can be varied up and or down by about 0.5 wt. %, in other embodiments, about 1 wt. %, and in other embodiments, about 2 wt. %.

Where a liquid crystal mixture includes a chiral ferroelectric nematic material, another suitable chiral dopant is the chiral dopant generally known as BDH 1218.

A liquid crystal mixture including a chiral ferroelectric nematic material can be used to prepare lenses and an array using spin coating. The details above relative to spin coating are therefore also incorporated here. Though, the coating on a glass substrate can be a thin layer of the adhesive generally known as Norland UV curing adhesive (NOA). Also, the glass substrate can include interdigitated electrodes.

After the array is fully made, when an electric field is applied, a combination of birefringence variation along with mechanical deformation of the surface of the lens is induced, leading to the variation of the focal length.

As disclosed herein, the present invention teaches a flow-induced formation of paraboloid-shape microlens arrays having unique polarization dependent optical properties. These polymer stabilized lenses can be useful for sensing polarization states of incoming lights, which can be utilized to separate visual fields into objects and backgrounds, thus providing extra information about the environment otherwise not possible for conventional spherical lenses.

EXAMPLES

Example 1

The liquid crystal compound, 4-cyano-4'-pentylbiphenyl (5CB) and the chiral dopant S811 were purchased from Merck and used without further purification. A mesogenic reactive monomer RM257 and a photoinitiator Irgacure 651 were obtained from EM Industry and Ciba, respectively (see item (a) of FIG. 4 for the chemical drawings of each ingredient). Liquid crystal mixtures with four different chiral concentrations (0, 2, 4 and 6 wt. % of S811) were used in the experiments. Additionally, 6 wt. % of the reactive monomer RM 257 and 1 wt. % of photoinitiator, Irgacure 651 were added to all the samples for photopolymerization. After adding the materials, the samples were heated to 60° C. and mixed thoroughly using a Fisher Scientific Vortex Mixer until the materials were uniformly mixed with the liquid crystal.

Glass substrates were prepared by spin coating a 10 nm thick polyimide PI-2555 (HD MicroSystems) layer on their top, then rubbing the layer uniformly with a velvet cloth after 1 hour of baking at 80° C. to promote uniform alignment of the liquid crystal director parallel to the substrates and the rubbing direction. Nickel Transmission Electron Microscope (TEM) grids purchased from Ted Pella, Inc. were cleaned in methanol with an ultrasonic cleaner (Branson B200) before use. Each cell in the double mesh was 20 µm thick and had a side length of $\alpha=100$ µm.

TEM grids were glued to the PI 2555 coated glass substrates by applying a thin layer of "Norland 68" adhesive on the bottom of the grid cell walls and placing the grid carefully on top of the glass, avoiding any spreading of the glue on the glass. The glass substrate had a thickness of 1 mm and a refractive index of 1.52. After the sample was exposed to 365 nm UV light (Black-Ray, Model B-100AP/R) for 10 min, the TEM grids were permanently settled on top of the PI 2555 coated glass, as shown in item (b) of FIG. 4. About 1 µL of liquid crystal mixture was then put on top of the grids using a micropipette, followed by spin-coating at various speeds to find the ideal spin coating conditions to form the lens. It was found that speeds over 4000 rpm caused the mixture to escape from the grids, while speeds of less 2500 rpm resulted in unstable lenses that quickly turned into a flat film. Lenses that appeared dark in the middle when the rubbing direction made a ±45° angle with the cross polarizers, were stable long enough for photopolymerization. Stable lenses were found to form after 3 s pre-spinning at 50 rpm, followed by 50 s spinning at 3000, 3300, 3400 and 3500 rpm for the 0, 2, 4 and 6 wt. % of the 5811 doped samples, respectively. Higher spinning rates were required at higher doping because of the increased viscosity of the sample. After verifying the microlens array structure using POM, the samples were exposed to 70 mW/cm$^2$, 365 nm UV light (Black-Ray, Model B-100AP/R) for 30 min to achieve photopolymerization that stabilized the shape and director alignment of the liquid crystal microlens array.

Figure 4:
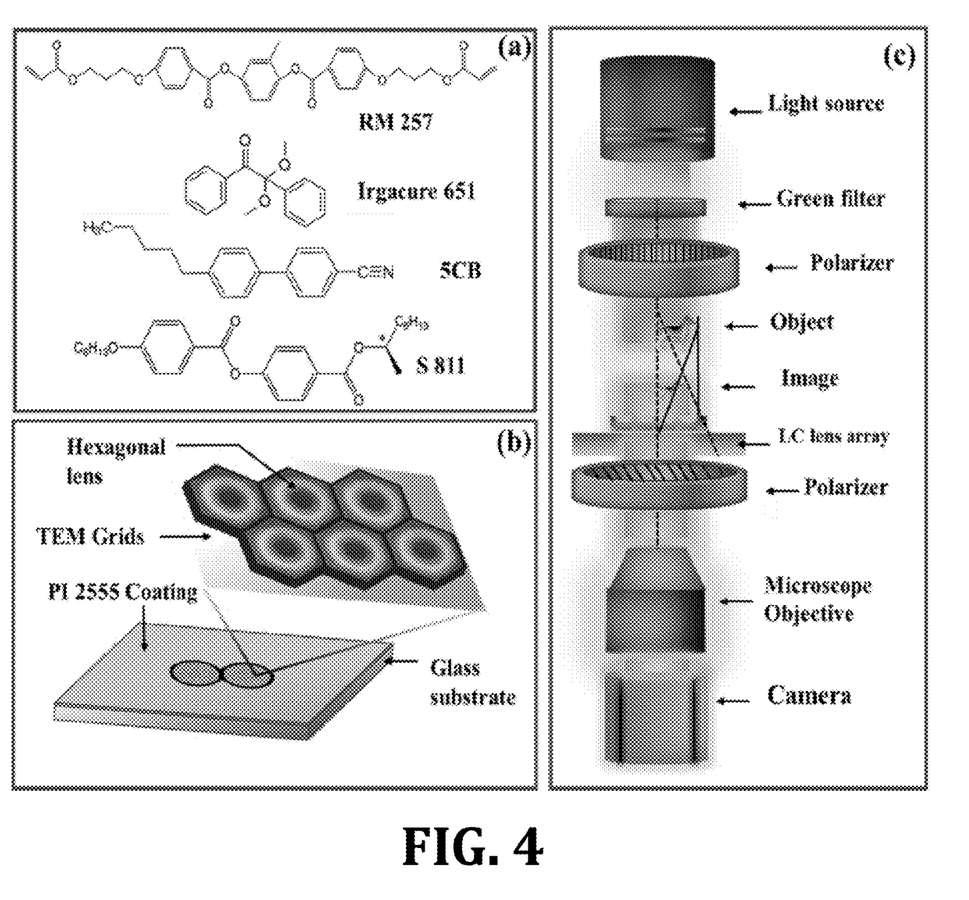
FIG. 4 is a variety of schematics, where: item (a) shows the molecular structures of RM257, Irgacure 651, 5CB, and S811; item (b) shows a double Nickel Transmission Electron Microscope (TEM) grid glued on coated glass with a lens of one or more embodiments of the present invention shown; and item (c) shows the experimental setup of one or more embodiments of the present invention with optical ray tracing of the lens array of one or more embodiments of the present invention.

The shapes of the individual microlenses were judged by polarized optical microscopy (POM) from the radial variation of the birefringence color by comparing them with the Michel-Levy birefringence chart. The 3D reconstructions of the surface profiles were also measured quantitatively with about a 0.3 nm resolution by Digital Holographic Microscopy (DHM) from Lyncée Tec. The experimental setup to characterize the optical properties of the lenses is shown in item (c) of FIG. 4. The full optical setup included an inverted microscope equipped with a CCD camera for image acquisition, a green filter, an object (as an example a dog is shown) and a set of linear or circular polarizers, among which item (c) of FIG. 4 shows crossed linear polarizers. Black lines indicate the optical ray tracing explaining the image formation.

Example 2

The fabrication process was similar as described in Example 1, except a thin layer of Norland UV curing adhesives (NOA) was placed on top of interdigitated electrodes. This was UV cured for 20 min. The electrode was designed with 10 µm width and 12 µm gaps. To fabricate the lens array, the polymer mixture was spin coated after permanently gluing the grid on top of the NOA layer. After the spin coating was done, the top glass was assembled with appropriate spacers before UV curing the sample for 30 min. When the electric field was applied, a combination of birefringence variation along with mechanical deformation of the surface of the lens was induced leading to the variation of the focal length—see FIG. 5.

Figure 6:
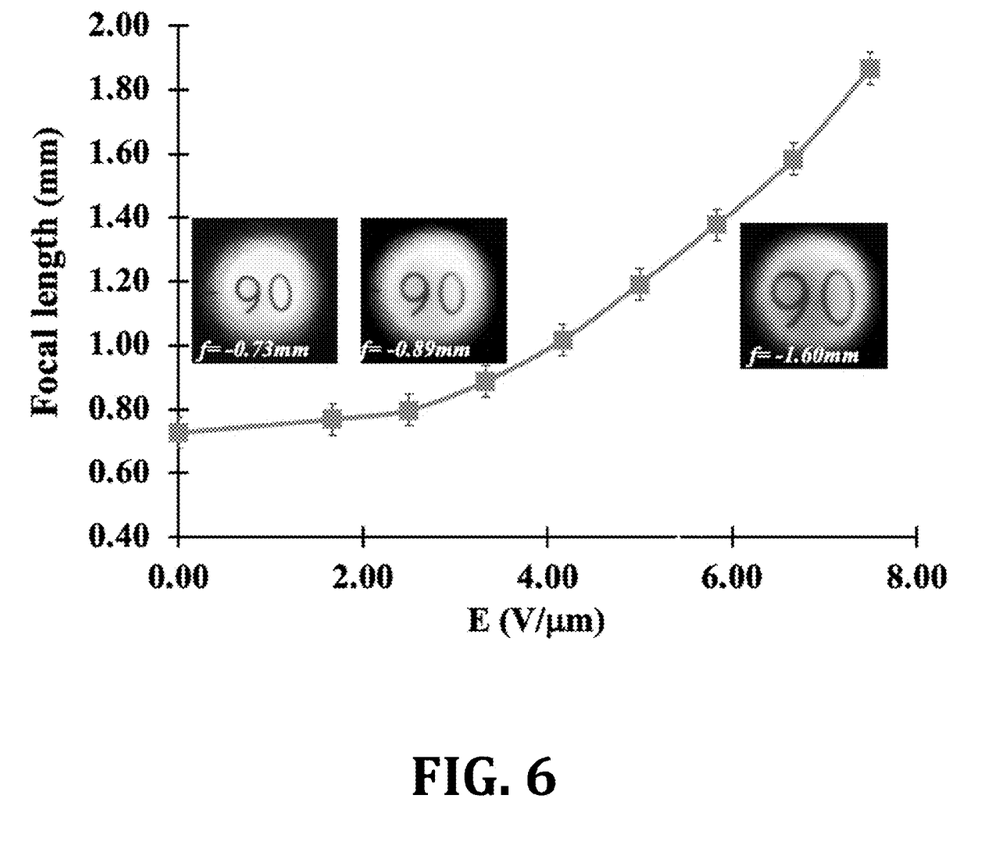
FIG. 6 is a graph showing measured focal lengths as a function of an electric field applied between the interdigitated electrodes shown in FIG. 5.

FIG. 6 shows the focal length as a function of the electric field for a microlens array fabricated with a polymer stabilized liquid crystal mixture with the composition shown in Table 3. The electric field dependence of the focal length shows a quadratic increase from $f \approx 0.79$ mm at $E=0$ V/µm to $f \approx 1.87$ mm at $E=8$ V/µm. The insets show images of an object "90" taken at different focal lengths.

Figure 5:
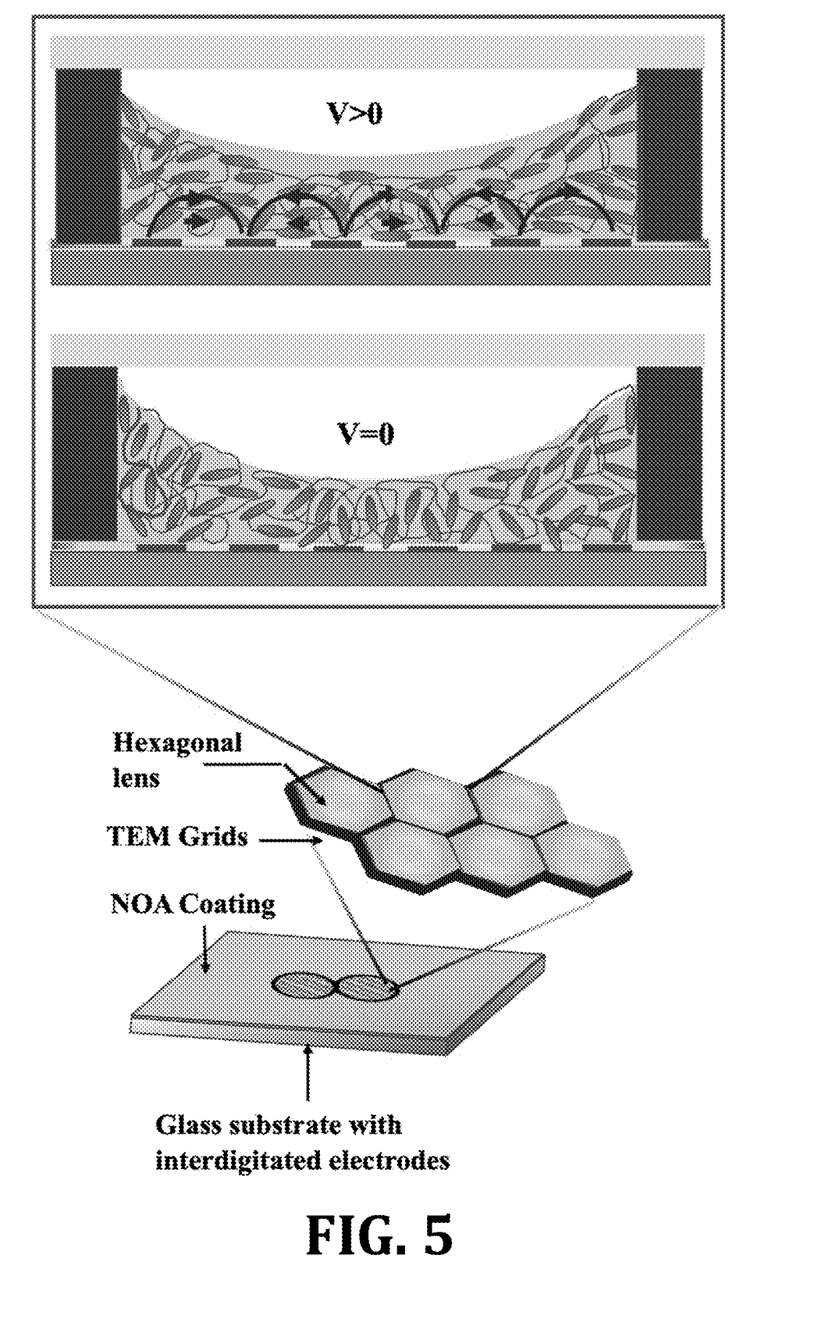
FIG. 5 is a schematic of an electrically controllable microlens array of one or more embodiments of the present invention, where the schematic includes an illustration of a lens array fabricated with a TEM grid, and further includes side view schematics of a lens before (V=0) and after (V>0) applying an in-plane electric field on interdigitated electrodes, where an approximate electric field is shown by black curved arrows.
Figure 7:
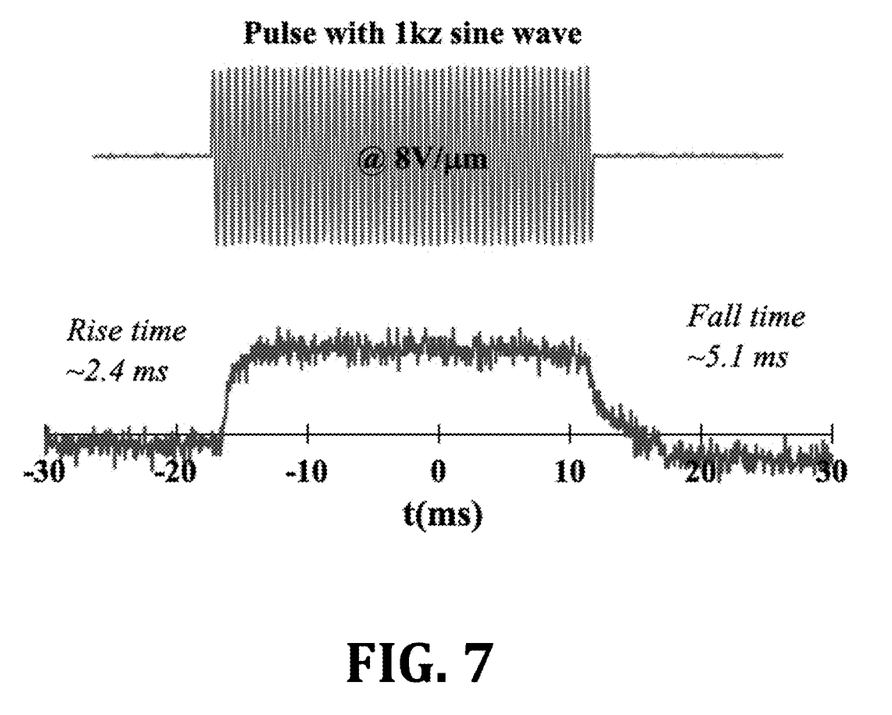
FIG. 7 is a graph showing switching time measurement for a lens array of one or more embodiments of the present invention using a 1 kHz sine wave pulse.

The increasing focal length indicates the radius of the curvature of the lens increases with the field, i.e., the concave length became shallower at increasing fields as schematically illustrated in FIG. 5. The switching time of the lens array was measured by applying a 1 kHz pulse wave, as shown in FIG. 7. Measurements indicated the rise time was ~2.4 ms at 8V/µm and a fall time of ~5.1 ms. Images created by the lens array with and without applying field were also obtained.

In light of the foregoing, it should be appreciated that the present invention advances the art by providing liquid crystal microlenses, arrays, and methods of making the same. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A composition for making a polymer stabilized nematic liquid crystal microlens, the composition comprising a nematic liquid crystal, a chiral dopant, a reactive monomer, and a photoinitiator, and a chiral ferroelectric nematic material.

2. The composition of claim 1, wherein the nematic liquid crystal is 4-cyano-4'-pentylbiphenyl, the chiral dopant is S-(+)-2-octyl 4-(4-hexyloxybenzoyloxy)benzoate, the reactive monomer is 2-methyl-1,4-phenylene bis(4-(3-(acryloyloxy)propoxy)benzoate, and the photoinitiator is 2,2-dimethoxy-1,2-diphenylethan-1-one.

3. The composition of claim 1, including from about 2 wt. % to about 6 wt. % of the chiral dopant, relative to an overall amount of the composition.

4. A method of preparing polymer stabilized nematic liquid crystal microlenses, the method comprising steps of
providing a liquid crystal mixture including a nematic liquid crystal, a chiral dopant, a reactive monomer, and a photoinitiator;
applying the liquid crystal mixture to a grid;
spin coating the grid having the liquid crystal mixture to thereby form a spin coated assembly; and
allowing polymerization of the reactive monomer of the spin coated assembly to thereby prepare the polymer stabilized nematic liquid crystal microlenses.

5. The method of claim 4, wherein the nematic liquid crystal is 4-cyano-4'-pentylbiphenyl, the chiral dopant is S-(+)-2-octyl 4-(4-hexyloxybenzoyloxy)benzoate, the reactive monomer is 2-methyl-1,4-phenylene bis(4-(3-(acryloyloxy)propoxy)benzoate, and the photoinitiator is 2,2-dimethoxy-1,2-diphenylethan-1-one.

6. The method of claim 4, the liquid crystal mixture further comprising a chiral ferroelectric nematic material.

7. The method of claim 4, wherein the grid is on a glass substrate.

8. The method of claim 7, wherein the grid is a nickel transmission electron microscope grid.

9. The method of claim 8, further comprising a step of gluing the nickel transmission electron microscope grid to the glass substrate.

10. The method of claim 4, wherein the step of allowing polymerization includes exposing the spin coated assembly to UV light.

11. The method of claim 4, wherein the liquid crystal mixture includes from about 2 wt. % to about 6 wt. % of the chiral dopant, relative to an overall amount of the liquid crystal mixture.

12. The composition of claim 1, wherein the composition is adapted to make a polymer stabilized nematic liquid crystal microlens having a tuning field which is reduced by over an order of magnitude compared to a dielectric nematic liquid crystal.

13. The composition of claim 1, wherein the composition is adapted to make a polymer stabilized nematic liquid crystal microlens having a director which can be switched with an electric field as low as $10^3$ V/m.

14. A polymer stabilized nematic liquid crystal microlens comprising a residue of the composition of claim 1.

15. The polymer stabilized nematic liquid crystal microlens of claim 14, the polymer stabilized nematic liquid crystal microlens having a tuning field which is reduced by over an order of magnitude compared to a dielectric nematic liquid crystal.

16. The polymer stabilized nematic liquid crystal microlens of claim 14, the polymer stabilized nematic liquid crystal microlens having a director which can be switched with an electric field as low as $10^3$ V/m.

* * * * *